(12) United States Patent
Koide et al.

(10) Patent No.: US 11,221,526 B2
(45) Date of Patent: Jan. 11, 2022

(54) DISPLAY DEVICE AND SUBSTRATE COMPRISING ORGANIC INSULATING LAYER

(71) Applicant: Japan Display Inc., Tokyo (JP)

(72) Inventors: Gen Koide, Tokyo (JP); Akihiro Ogawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 41 days.

(21) Appl. No.: 16/795,587

(22) Filed: Feb. 20, 2020

(65) Prior Publication Data

US 2020/0271976 A1 Aug. 27, 2020

(30) Foreign Application Priority Data

Feb. 22, 2019 (JP) .............................. JP2019-030286

(51) Int. Cl.
| | | |
|---|---|---|
| *G02F 1/1345* | (2006.01) | |
| *G02F 1/1339* | (2006.01) | |
| *G02F 1/1333* | (2006.01) | |
| G02F 1/1368 | (2006.01) | |
| G02F 1/1362 | (2006.01) | |

(52) U.S. Cl.
CPC ...... *G02F 1/13458* (2013.01); *G02F 1/13394* (2013.01); *G02F 1/13452* (2013.01); *G02F 1/133345* (2013.01); *G02F 1/1368* (2013.01); *G02F 1/136286* (2013.01)

(58) Field of Classification Search
CPC ........... G02F 1/133345; G02F 1/13394; G02F 1/13452; G02F 1/13458
See application file for complete search history.

(56) References Cited

U.S. PATENT DOCUMENTS

| | | | |
|---|---|---|---|
| 2015/0331265 A1* | 11/2015 | Mori ..................... | G02F 1/1341 349/106 |
| 2015/0346556 A1* | 12/2015 | Hirota ................... | G02F 1/1339 349/43 |
| 2016/0147097 A1 | 5/2016 | Makino et al. | |

FOREIGN PATENT DOCUMENTS

| | | |
|---|---|---|
| JP | 2015-225227 A | 12/2015 |
| JP | 2016-099499 A | 5/2016 |

* cited by examiner

*Primary Examiner* — Dung T Nguyen
(74) *Attorney, Agent, or Firm* — Xsensus LLP

(57) ABSTRACT

According to one embodiment, a display device includes a first substrate and a second substrate. The first substrate includes a first area including a display area, a second area adjacent to the first area, and an organic insulating layer formed over the first area and the second area. The second substrate includes a substrate end located in a border between the first area and the second area, and overlaps the first area. The organic insulating layer includes a first groove portion surrounding the display area and formed in a circular shape along an outline of the first substrate. The first groove portion includes a first sidewall and a second sidewall. The first and second sidewalls intersect the substrate end in a plan view.

10 Claims, 10 Drawing Sheets

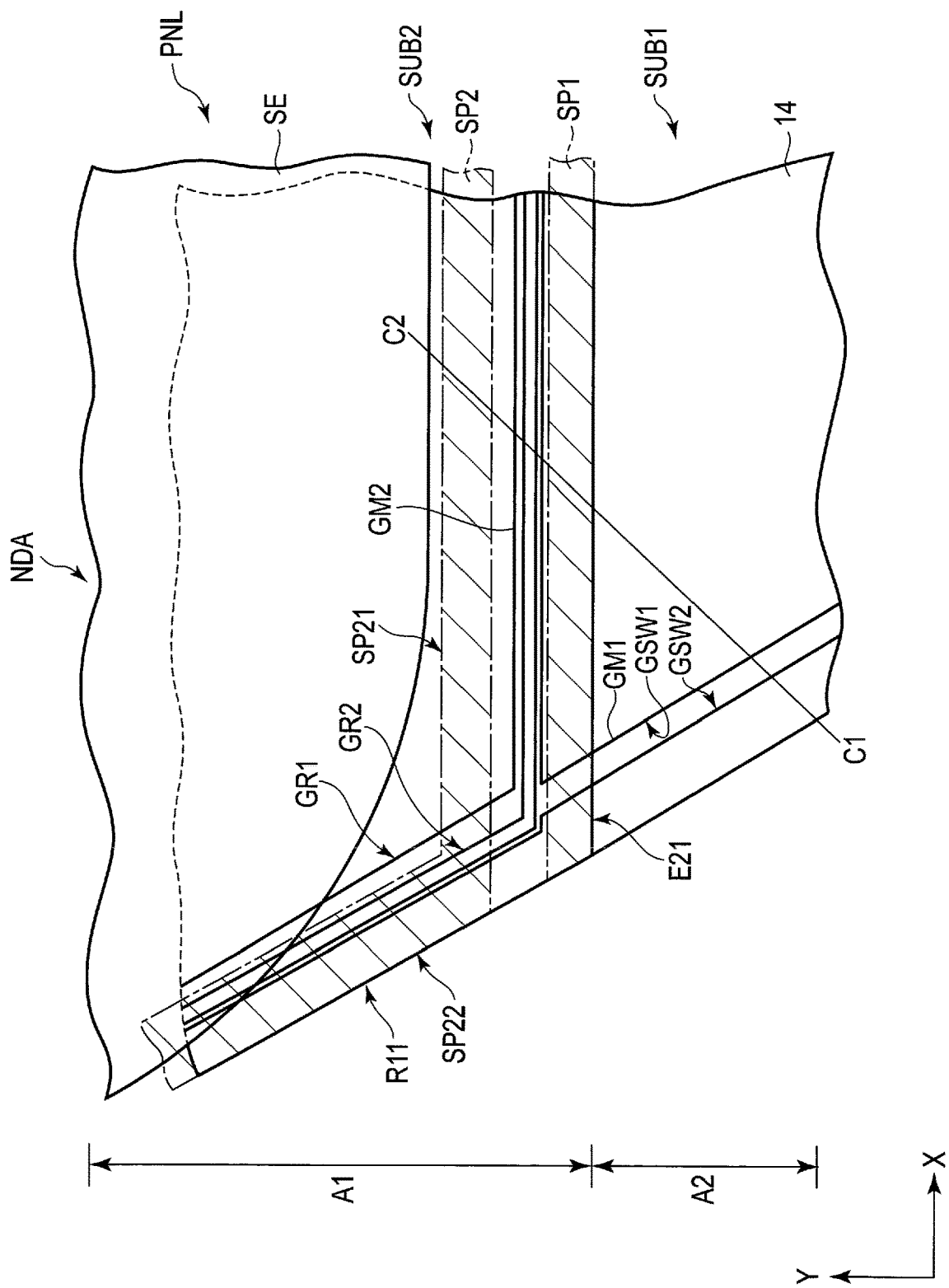
F I G. 6

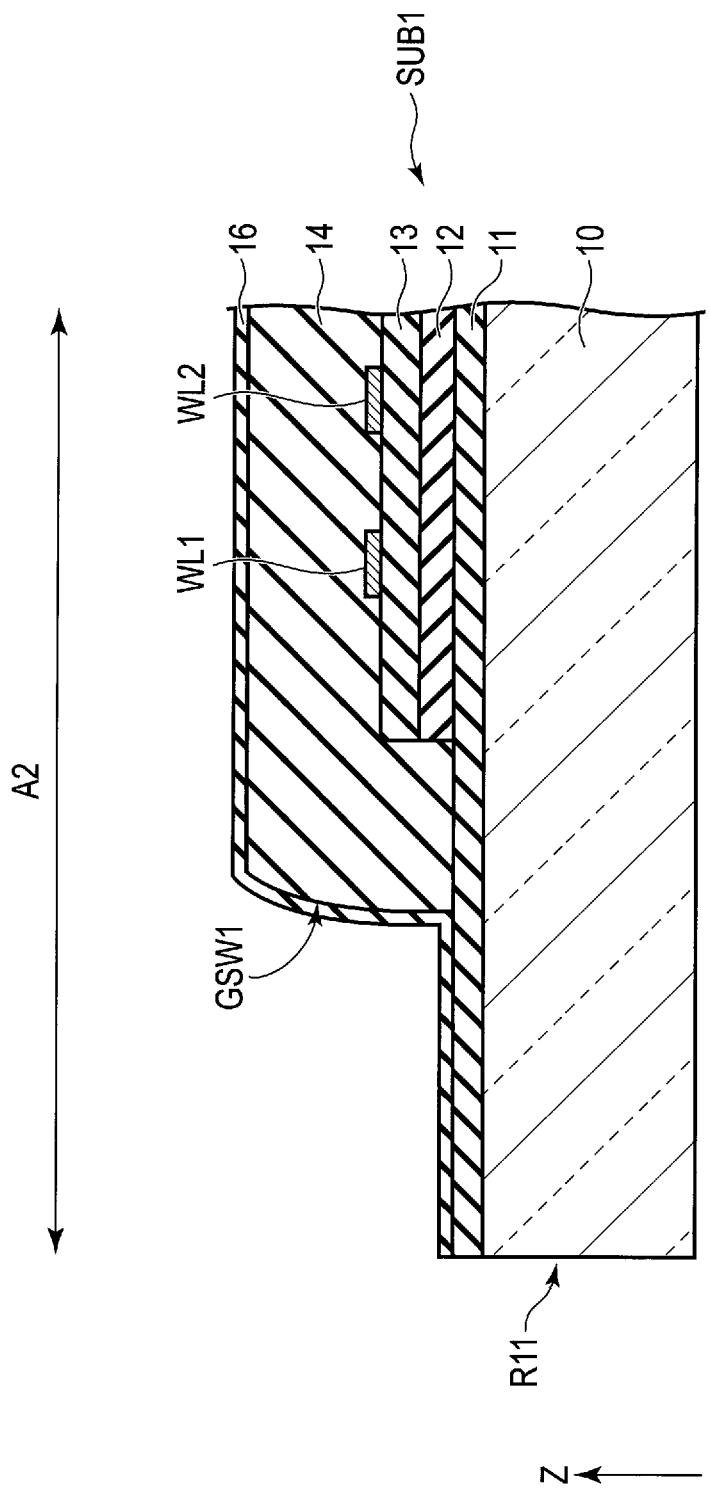
F I G. 11

DISPLAY DEVICE AND SUBSTRATE COMPRISING ORGANIC INSULATING LAYER

CROSS-REFERENCE TO RELATED APPLICATIONS

This application is based upon and claims the benefit of priority from Japanese Patent Application No. 2019-030286, filed Feb. 22, 2019, the entire contents of which are incorporated herein by reference.

FIELD

Embodiments described herein relate generally to a display device and a substrate comprising an organic insulating layer.

BACKGROUND

In recent years, various types of liquid crystal display devices as follows have been considered. The liquid crystal display devices comprise a thin-film transistor (TFT) substrate in which pixels comprising a pixel electrode, a TFT, etc., are formed in matrix, and a counter-substrate facing the TFT substrate, and rotate liquid crystal molecules by an electric field having a direction parallel to the two substrates. For example, a liquid crystal display device in which an organic insulating layer comprises a groove-like through hole formed so as to surround an area holding a liquid crystal in the overlapping area of two substrates is disclosed.

BRIEF DESCRIPTION OF THE DRAWINGS

FIG. 6 is a plan view in which the round portion shown in FIG. 5 is enlarged.

FIG. 11 is a cross-sectional view showing a second modified example of the second structural example shown in FIG. 9.

DETAILED DESCRIPTION

Figure 1:
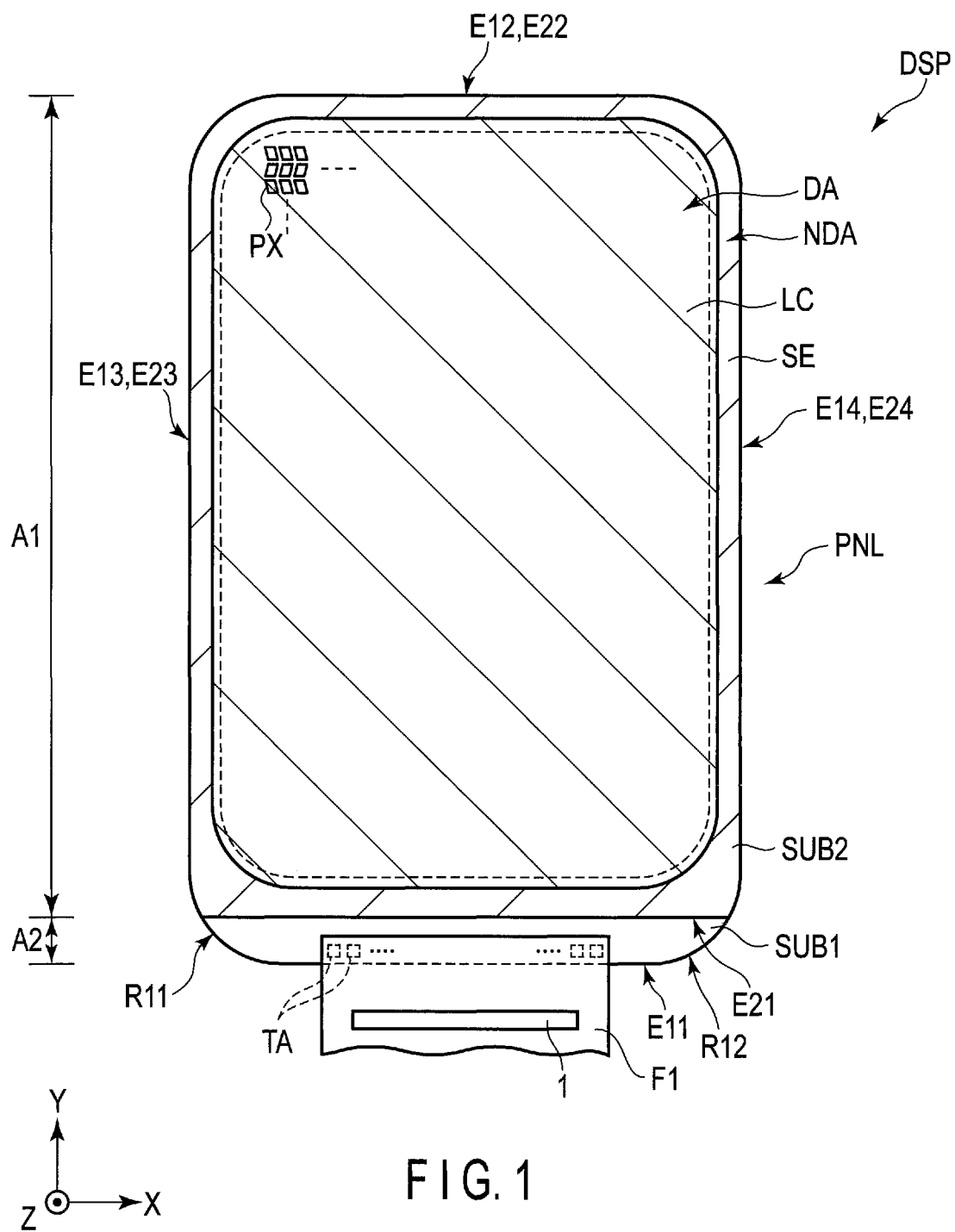
FIG. 1 is a plan view showing a display device according to an embodiment.

In general, according to one embodiment, a display device comprises a first substrate and a second substrate. The first substrate comprises a first area including a display area, a second area adjacent to the first area, and an organic insulating layer formed over the first area and the second area. The second substrate comprises a substrate end located in a border between the first area and the second area, and overlaps the first area. The first area is an area in which the first substrate overlaps the second substrate. The second area is an area in which the first substrate is exposed from the second substrate. The organic insulating layer comprises a first groove portion surrounding the display area and formed in a circular shape along an outline of the first substrate.

The first groove portion comprises a first sidewall formed by the organic insulating layer and located on a display area side, and a second sidewall formed by the organic insulating layer, located on a side opposite to the first sidewall and located on the outline side of the first substrate. The first and second sidewalls forming the first groove portion intersect the substrate end in a plan view.

According to another embodiment, a substrate comprises an insulating substrate which includes a first area, and a second area adjacent to the first area, a plurality of terminals which is located in the second area and connected to a signal source, a plurality of conductive lines which are connected to the terminals and extend in the first area and an organic insulating layer which is formed over the first area and the second area. The organic insulating layer comprises a groove portion formed in a circular shape along an outline of the insulating substrate. The groove portion comprises a first sidewall which is formed by the organic insulating layer on a display area side and a second sidewall which is formed by the organic insulating layer, located on a side opposite to the first sidewall and located on the outline side. The conductive lines comprise an outermost conductive line which is closest to the outline and located on an inner side in comparison with the groove portion in a plan view.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a plan view showing a display device DSP according to an embodiment. For example, a first direction X, a second direction Y and a third direction Z are perpendicular to one another. However, they may intersect at an angle other than 90 degrees. The first direction X and the second direction Y are equivalent to directions parallel to the main surfaces of the substrates constituting the display device DSP. The third direction Z is equivalent to the thickness direction of the display device DSP. In this specification, the position on the side to which the arrow indicating the third direction Z points is referred to as an upper side. The position on the opposite side is referred to as a lower side. The observation position for observing the display device DSP is on the side to which the arrow indicating the third direction Z points. A plan view is defined as appearance when the X-Y plane defined by the first direction X and the second direction Y is viewed from the observation position.

As shown in FIG. 1, the display device DSP comprises a display panel PNL, an IC chip 1 and a wiring substrate F1.

The display panel PNL comprises a first substrate SUB1, a second substrate SUB2, a liquid crystal layer LC and a sealant SE. In FIG. 1, the liquid crystal layer LC and the sealant SE are indicated by different types of hatched lines. The display panel PNL comprises a display area DA for displaying an image, and a frame-shaped non-display area NDA surrounding the display area DA. The sealant SE is located in the non-display area NDA, is used to attach the first substrate SUB1 to the second substrate SUB2, and seals the liquid crystal layer LC.

The first substrate SUB1 comprises, as its outline, end portions E11 and E12 extending in the first direction X, end portions E13 and E14 extending in the second direction Y, a round portion R11 located between the end portion E11 and the end portion E13, and a round portion R12 located between the end portion E11 and the end portion E14. The second substrate SUB2 comprises, as its outline, end portions E21 and E22 extending in the first direction X, and end portions E23 and E24 extending in the second direction Y. The first substrate SUB1 comprises a first area A1 and a second area A2. The first area A1 is adjacent to the second area A2 in the second direction Y. In a plan view, the second substrate SUB2 overlaps the first substrate SUB1 in the first area A1, and does not overlap the first substrate SUB1 in the second area A2. The end portion E21 is equivalent to the substrate end located in the border between the first area A1 and the second area A2. In other words, the first area A1 is equivalent to the area surrounded by the end portion E21, the end portion E12, the end portion E13 and the end portion E14 in a plan view. The second area A2 is equivalent to the area surrounded by the end portion E11, the end portion E21, the round portion R11 and the round portion R12 in a plan view. Further, the first area A1 may be referred to as the portion of two substrates in the display panel PNL in which the first substrate SUB1 overlaps the second substrate SUB2. The second area A2 may be referred to as the portion of a single substrate in the display panel PNL in which the first substrate SUB1 is exposed from the second substrate SUB2.

The display area DA is included in the first area A1. The display area DA is equivalent to the area in which a plurality of pixels PX are arrayed in matrix (in rows and columns) in the first direction (column direction) X and the second direction (row direction) Y. Here, each pixel PX indicates the minimum unit which can be separately controlled based on a pixel signal. Each pixel PX may be referred to as a subpixel. Each pixel PX is, for example, one of a red pixel displaying red, a green pixel displaying green, a blue pixel displaying blue and a white pixel displaying white.

The outside of the display area DA in the first area A1, and the second area A2 are equivalent to the non-display area NDA. The first substrate SUB1 comprises a plurality of terminals TA in the second area A2. The terminals TA are arranged in the first direction X. The IC chip 1 may read a signal from the display panel PNL, but mainly functions as a signal source which supplies a signal to the display panel PNL. These signal sources are mounted in the second area A2. The wiring substrate F1 overlaps the terminals TA and is electrically connected to the terminals TA. The IC chip may comprise a structure called Chip On Film (COF) mounted on the wiring substrate F1 as shown in FIG. 1, or may comprise a structure called Chip On Glass (COG) directly mounted in the second area A2. When a COF structure is employed as shown in FIG. 1, the second area A2 can be made narrower than that of a COG structure.

Figure 2:
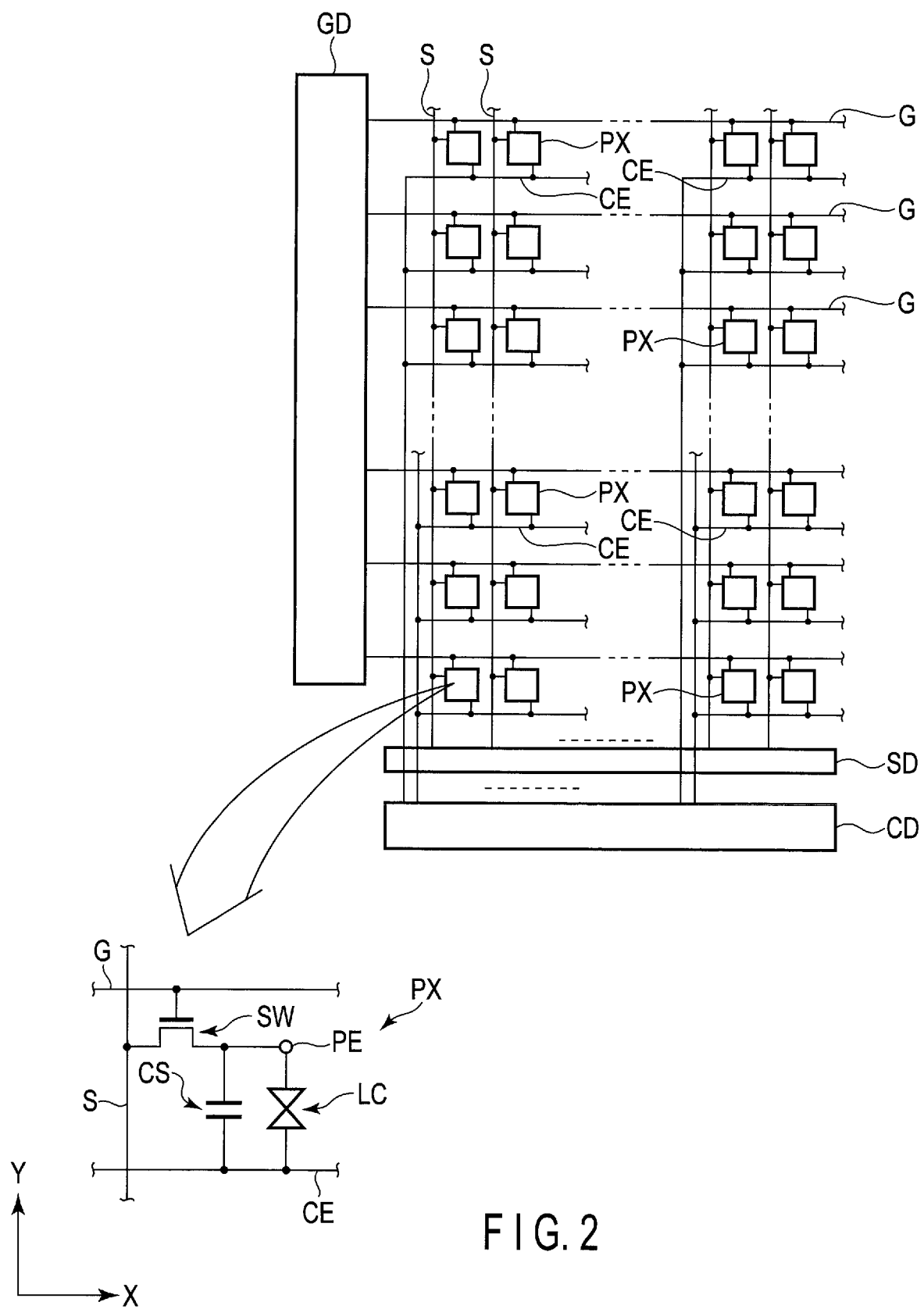
FIG. 2 shows the basic structure of pixels and an equivalent circuit.

FIG. 2 shows the basic structure of pixels PX and an equivalent circuit.

As shown in FIG. 2, a plurality of scanning lines G are connected to a scanning line drive circuit GD, and a plurality of signal lines S are connected to a signal line drive circuit SD. Each of the scanning lines G and the signal lines S is formed of a metal material such as aluminum (Al), titanium (Ti), silver (Ag), molybdenum (Mo), tungsten (W), copper (Cu) or chrome (Cr), or an alloy prepared by combining these metal materials. Each of the scanning lines G and the signal lines S may comprise either a single-layer structure or a multilayer structure. The scanning lines G or the signal lines S may not linearly extend. They may be partially curved. For example, even when the signal lines S are partially curved, the signal lines S extend in the second direction Y.

A common electrode CE is provided over a plurality of pixels PX. The common electrode CE is connected to a voltage application portion CD. In an image display mode, the voltage application portion CD applies common voltage Vcom to the common electrode CE.

Each pixel PX comprises a switching element SW, a pixel electrode PE, a common electrode CE, a liquid crystal layer LC, etc. Each switching element SW is structured by, for example, a TFT, and is electrically connected to a corresponding scanning line G and a corresponding signal line S. Each scanning line G is electrically connected to the switching elements SW of the pixels PX arranged in the first direction X. Each signal line S is electrically connected to the switching elements SW of the pixels PX arranged in the second direction Y. A control signal for controlling the switching elements SW is supplied to the scanning lines G. As a signal different from a control signal, a video signal is supplied to the signal lines S. The pixel electrode PE is electrically connected to the switching element SW. The liquid crystal layer LC is driven by the electric field generated between the pixel electrode PE and the common electrode CE. For example, capacitance CS is formed between an electrode having the same electric potential as the common electrode CE and an electrode having the same electric potential as the pixel electrode PE.

Figure 3:
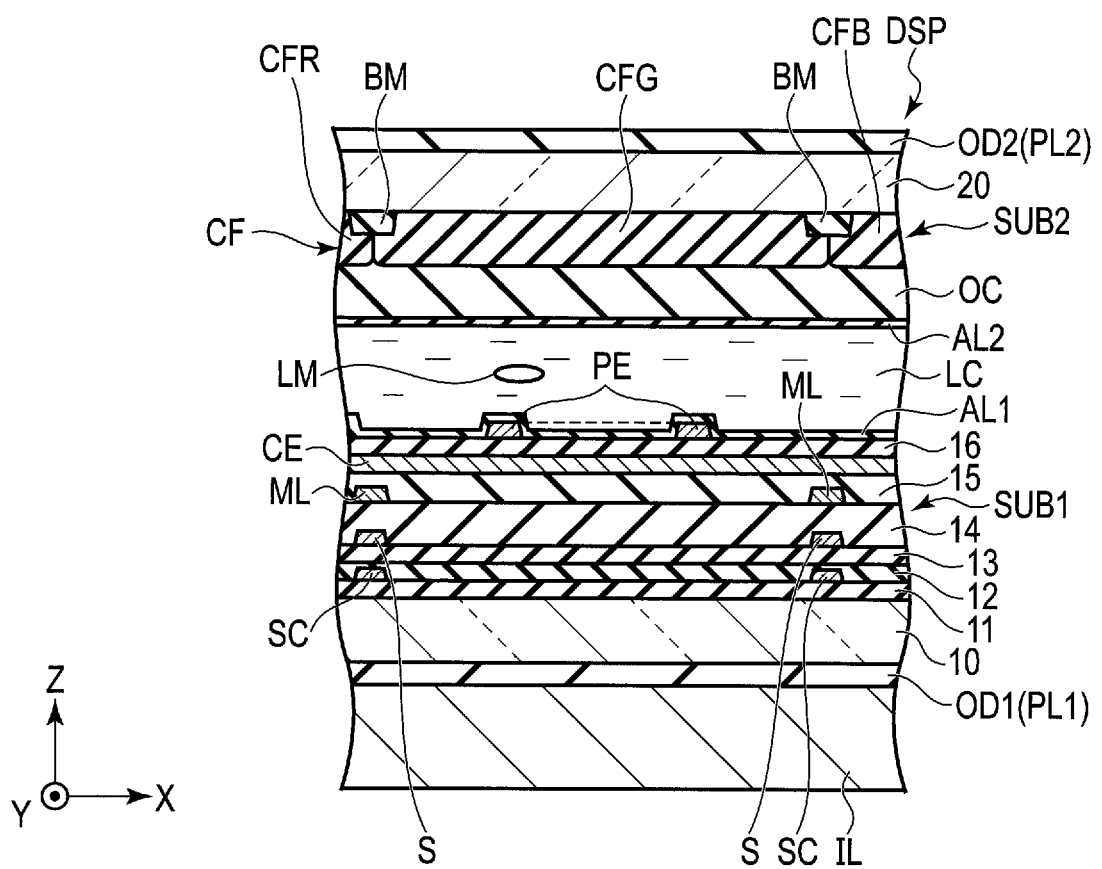
FIG. 3 is a cross-sectional view showing a first structural example of the display panel shown in FIG. 1.

FIG. 3 is a cross-sectional view showing a first structural example of the display panel PNL shown in FIG. 1. The example shown in FIG. 3 is equivalent to an example to which a fringe field switching (FFS) mode as one of the display modes using a lateral electric field is applied.

As shown in FIG. 3, the first substrate SUB1 comprises an insulating substrate 10, insulating layers 11 to 16, a semiconductor layer SC, signal lines S, metal conductive lines ML, a common electrode CE, pixel electrodes PE, an alignment film AL1, etc. The insulating substrate 10 is a transparent substrate such as a glass substrate or a flexible resinous substrate. The insulating layer 11 is located on the insulating substrate 10. The semiconductor layer SC is located on the insulating layer 11 and is covered with the insulating layer 12. The semiconductor layer SC is formed of, for example, polycrystalline silicon. However, the semiconductor layer SC may be formed of amorphous silicon or an oxide semiconductor. The insulating layer 12 is covered with the insulating layer 13. The scanning lines G shown in FIG. 2 are located between the insulating layer 12 and the insulating layer 13. Each signal line S is located on the insulating layer 13 and is covered with the insulating layer 14. Each metal conductive line ML is located on the insulating layer 14 and is covered with the insulating layer 15. Each metal conductive line ML is formed of a metal material such as aluminum (Al), titanium (Ti), silver (Ag), molybdenum (Mo), tungsten (W), copper (Cu) or chrome (Cr), or an alloy prepared by combining these metal materials. Each metal conductive line ML may comprise either a single-layer structure or a multilayer structure. Each metal conductive line ML extends parallel to a corresponding signal line S, and is located immediately above the signal line S.

The common electrode CE is located on the insulating layer 15 and is covered with the insulating layer 16. Each pixel electrode PE is located on the insulating layer 16 and is covered with the alignment film AL1. Each pixel electrode PE faces the common electrode CE via the insulating layer 16. The common electrode CE and each pixel electrodes PE are formed of a transparent conductive material such as indium tin oxide (ITO) or indium zinc oxide (IZO). Each pixel electrode PE is a linear electrode. The common electrode CE is an electrode having the shape of a flat plate and provided to be shared with a plurality of pixels PX. The pixel electrodes PE may be an electrode having the shape of a flat plate, and a linear common electrode may be provided between the pixel electrode PE and a liquid crystal layer LC.

The insulating layer 11, the insulating layer 12 and the insulating layers 13 and 16 are inorganic insulating layers formed of an inorganic insulating material such as silicon oxide (SiO), silicon nitride (SiN) or silicon oxynitride (SiON). The insulating layer 16 is formed of, for example, silicon nitride. The insulating layer 11, the insulating layer 12 and the insulating layers 13 and 16 may comprise either a single-layer structure or a multilayer structure. The insulating layers 14 and 15 are organic insulating layer formed of an organic insulating material such as acrylic resin.

The second substrate SUB2 comprises an insulating substrate 20, a color filter CF, a light-shielding layer BM, a transparent layer OC and an alignment film AL2. The insulating substrate 20 is a transparent substrate such as a glass substrate or a flexible resinous substrate. The color filter CF, the light-shielding layer BM and the transparent layer OC are located between the insulating substrate 20 and the liquid crystal layer LC. The alignment film AL2 is in contact with the liquid crystal layer LC. The alignment films AL1 and AL2 are formed of, for example, a material exhibiting horizontal alignment property. The transparent layer OC covers the color filter CF and the light-shielding layer BM. The transparent layer OC is, for example, a transparent organic insulating layer. In the example shown in the figure, the color filter CF is provided in the second substrate SUB2. However, the color filter CF may be provided in the first substrate SUB1. The color filter CF includes a red color filter CFR, a green color filter CFG and a blue color filter CFB. The green color filter CFG faces the pixel electrodes PE. The red color filter CFR and the blue color filter CFB also face other pixel electrodes PE which are not shown in the figure.

The liquid crystal layer LC is located between the first substrate SUB1 and the second substrate SUB2, and is held between the alignment film AL1 and the alignment film AL2. The liquid crystal layer LC comprises liquid crystal molecules LM. The liquid crystal layer LC is formed of a positive liquid crystal material (in other words, a liquid crystal material having positive dielectric anisotropy) or a negative liquid crystal material (in other words, a liquid crystal material having negative dielectric anisotropy).

An optical element OD1 including a first polarizer PL1 is attached to the insulating substrate 10. An optical element OD2 including a polarizer PL2 is attached to the insulating substrate 20. The optical elements OD1 and OD2 may comprise a retardation plate, a scattering layer and an antireflective layer depending on the need. An illumination device IL illuminates the first substrate SUB1 of the display panel PNL with white illumination light.

In this display panel PNL, the liquid crystal molecules LM are initially aligned in a predetermined direction between the alignment films AL1 and AL2 in an off-state where no electric field is formed between the pixel electrodes PE and the common electrode CE. In this off-state, the illumination light emitted from the illumination device IL to the display panel PNL is absorbed by the optical elements OD1 and PD2, thereby performing dark display. In an on-state where an electric field is formed between the pixel electrodes PE and the common electrode CE, the liquid crystal molecules LM are aligned in a direction different from the initial alignment direction by an electric field. The alignment direction is controlled by an electric field. In this on-state, the illumination light emitted from the illumination device IL partially passes through the optical elements OD1 and OD2, thereby performing bright display.

The display panel PNL of the present embodiment is not limited to a transmissive display panel PNL comprising a transmissive display function which displays an image by selectively transmitting light from the rear side of the first substrate SUB1. The display panel PNL of the present embodiment may be a reflective display panel PNL comprising a reflective display function which displays an image by selectively reflecting light from the front side of the second substrate SUB2, or a transflective display panel PNL comprising both a transmissive display function and a reflective display function.

In the present embodiment, this specification explains a display panel PNL corresponding to a display mode using a lateral electric field along the main surfaces of the substrates. However, the structure is not limited to this example. The display panel PNL may comprise a structure corresponding to a display mode using a longitudinal electric field along the normal of the main surfaces of the substrates, a display mode using an inclined electric field inclined at a tilt with respect to the main surfaces of the substrates, or a display mode appropriately using a combination of a lateral electric field, a longitudinal electric field and an inclined electric field. Here, the main surfaces of the substrates are surfaces parallel to the X-Y plane defined by the first direction X and the second direction Y.

Figure 4:
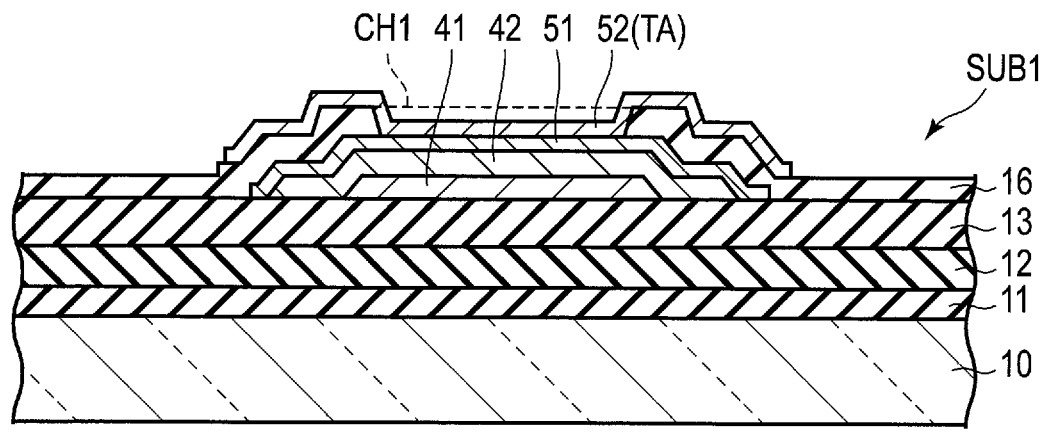
FIG. 4 is a cross-sectional view of the terminal shown in FIG. 1.

FIG. 4 is a cross-sectional view of the terminal TA shown in FIG. 1.

As shown in FIG. 4, the first substrate SUB1 further comprises a metal layer 41, a metal layer 42, a transparent conductive layer 51 and a transparent conductive layer 52. The metal layer 41 is located on the insulating layer 13. The metal layer 42 is in contact with and covers the metal layer 41. The transparent conductive layer 51 is in contact with and covers the metal layer 42. The insulating layer 16 comprises a contact hole CH1 penetrating the insulating layer 16 and reaching the transparent conductive layer 51, and is in contact with the insulating layer 13. The transparent conductive layer 52 is located on the insulating layer 16 and is in contact with the transparent conductive layer 51 in the contact hole CH1. The terminal TA is equivalent to, for example, one of the metal layer 41, the metal layer 42, the transparent conductive layer 51 and the transparent conductive layer 52, or a stacked layer portion including two or more layers of these layers. In the example shown in the figure, the first substrate SUB1 comprises neither the insulating layer 14 nor the insulating layer 15 in the area in which the terminal TA is provided.

For example, the metal layer 41 is a stacked layer body in which a layer including titanium (Ti), a layer including aluminum (Al) and a layer including titanium (Ti) are stacked in this order. For example, the metal layer 42 is a stacked layer body in which a layer including molybdenum (Mo), a layer including aluminum (Al) and a layer including molybdenum (Mo) are stacked in this order. The transparent conductive layers 51 and 52 are formed of a transparent conductive material such as ITO or IZO.

Figure 5:
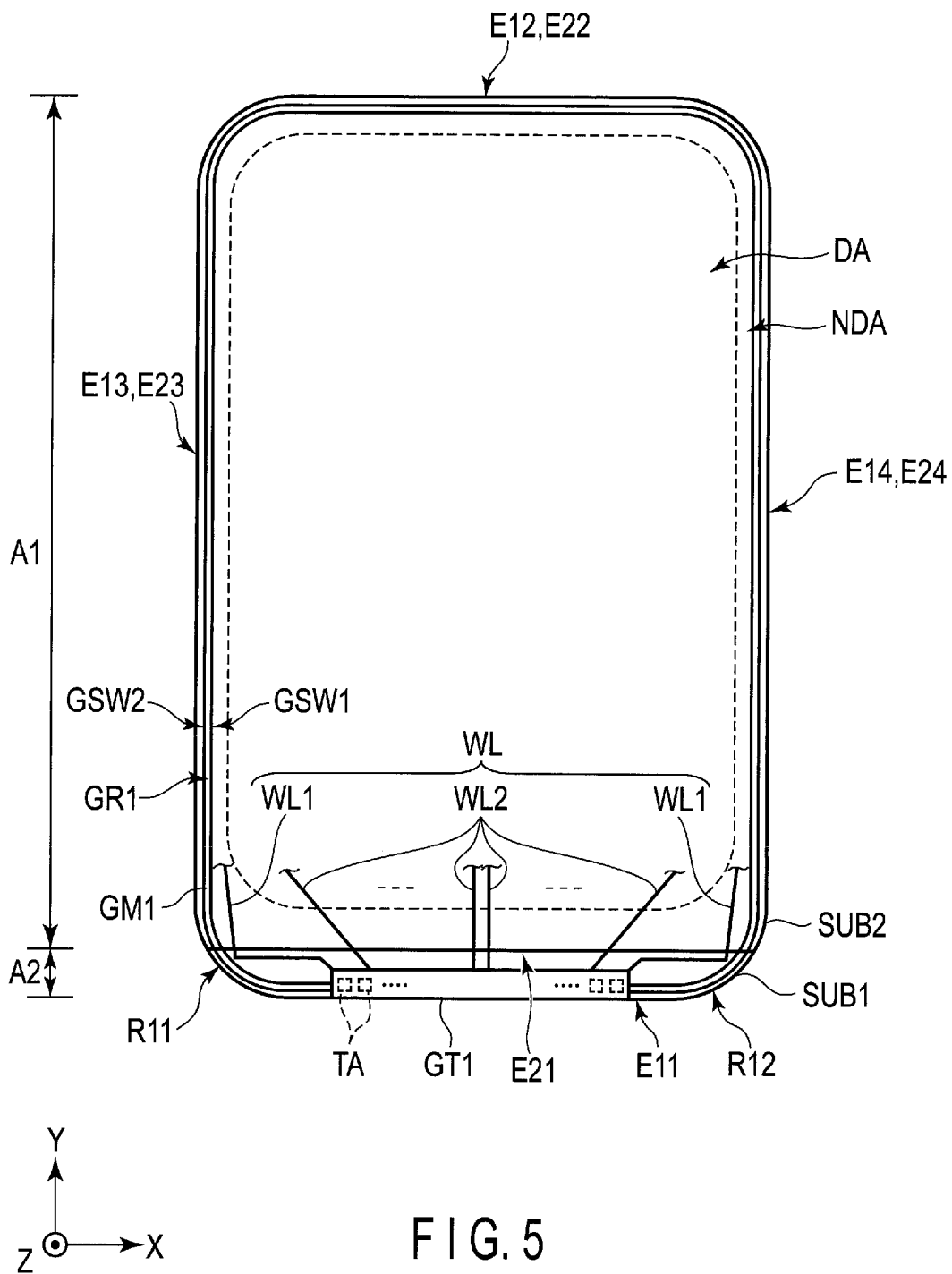
FIG. 5 is a plan view showing a groove portion provided in the display panel.

FIG. 5 is a plan view showing a groove portion GR1 provided in the display panel PNL.

As shown in FIG. 5, the first substrate SUB1 comprises a plurality of conductive lines WL. The conductive lines WL include, for example, conductive lines WL1 and conductive lines WL2. The conductive lines WL1 are, of the conductive lines WL formed in the first substrate SUB1, the outermost conductive lines located on the outermost side (specifically, the outline side of the display panel PNL), in other words, the outermost conductive lines closest to the outline (the end portions E11 to E14 and the round portions R11 and R12) of the first substrate SUB1. In the example shown in the figure, a plurality of conductive lines WL1 are formed, and are located between the end portion E13 and the display area DA and between the end portion E14 and the display area DA. The conductive lines WL2 are a plurality of conductive lines located on the inner side (in other words, on the display area DA side) in comparison with the outermost conductive lines WL1. The conductive lines WL are formed of, for example, the same material as the signal lines S in the same layer as the signal lines S, and are connected to the terminals TA, respectively. In the example shown in the figure, the conductive lines WL intersect the end portion E21 and extend from the second area A2 to the first area A1. The conductive lines WL include a conductive line connected to an inspection pad or a ground pad in the second area A2. The conductive lines WL may be formed of, for example, the same material as the scanning lines G in the same layer as the scanning lines G, or may be conductive lines formed by combining the scanning lines G, the signal lines S and the conductive lines formed in the same layer as the metal layer 41.

The display panel PNL comprises the groove portion GR1. The groove portion GR1 penetrates the insulating layer 14. The groove portion GR1 comprises a sidewall GSW1 on the display area DA side, and a sidewall GSW2 located on a side opposite to the sidewall GSW1 and located on the outline side of the first substrate SUB1. The groove portion GR1 comprises a main portion GM1 and a terminal portion GT1. The terminal portion GT1 is equivalent to the area in which the insulating layer 14 is not provided as shown in FIG. 4 and which is exposed from the insulating layer 14 in the area overlapping the terminals TA. The main portion GM1 is located in the non-display area NDA. In the first area A1, the main portion GM1 extends in the second direction Y between the end portion E13 and the display area DA, extends in the first direction X between the end portion E12 and the display area DA, and extends in the second direction Y between the end portion E14 and the display area DA. In a plan view, the main portion GM1 intersects the end portion E21, and in the second area A2, extends along the round portions R11 and R12, extends in the first direction X between the end portions E21 and E11, and is continuous with the terminal portion GT1. In the example shown in the figure, the groove portion GR1 surrounds the display area DA, is formed in a circular pattern along the outline of the first substrate SUB1, intersects the end portion E21 and overlaps the terminals TA. All the conductive lines WL provided in the first substrate SUB1 are located on the inner side (in other words, the display area DA side) in comparison with the groove portion GR1 in a plan view.

FIG. 6 is a plan view in which the round portion R11 shown in FIG. 5 is enlarged. In the round portion R12, the display panel PNL comprises the same structure as the round portion R11.

As shown in FIG. 6, the second substrate SUB2 further comprises a spacer SP1 and a spacer SP2. In FIG. 6, the spacers SP1 and SP2 are indicated by hatched lines. The spacer SP1 extends in the first direction X along the end portion E21, and intersects the groove portion GR1. The spacer SP1 is provided along the substrate end E21 of the second substrate SUB2. The substrate end E21 of the second substrate SUB2 is formed by scribing and fracturing along the spacer SP1. The spacer SP2 comprises a part SP21, and a part SP22 continuous with the part SP21. The part SP21 extends in the first direction X, and the part SP22 extends along the round portion R11. The part SP21 and the spacer SP1 are spaced apart from each other in the second direction Y. The part SP22 is, for example, a portion of the spacer for scribing provided in the border of the adjacent display panel PNL in the motherboard in which a plurality of display panels PNL are formed.

The groove portion GR1 comprises a linear portion GM2. The linear portion GM2 is continuous with the main portion GM1, and extends in the first direction X along the end portion E21. The linear portion GM2 is located between the spacer SP1 and the part SP21. The display panel PNL further comprises a groove portion GR2. The groove portion GR2 penetrates the insulating layer 16. In the example shown in the figure, the groove portion GR2 is located in the non-display area NDA of the first area A1. The groove portion GR2 overlaps the groove portion GR1 in a plan view. The width of the groove portion GR2 is less than that of the groove portion GR1. Here, the width is equivalent to the length in a direction perpendicular to the extension direction of each groove portion. The groove portion GR2 is located inside the groove portion GR1 in a plan view.

The sealant SE overlaps the main portion GM1, the groove portion GR2 and the part SP21 in a plan view. In the example shown in the figure, the sealant SE is spaced apart from the part SP21. However, the sealant SE may overlap the part SP21.

Figure 7:
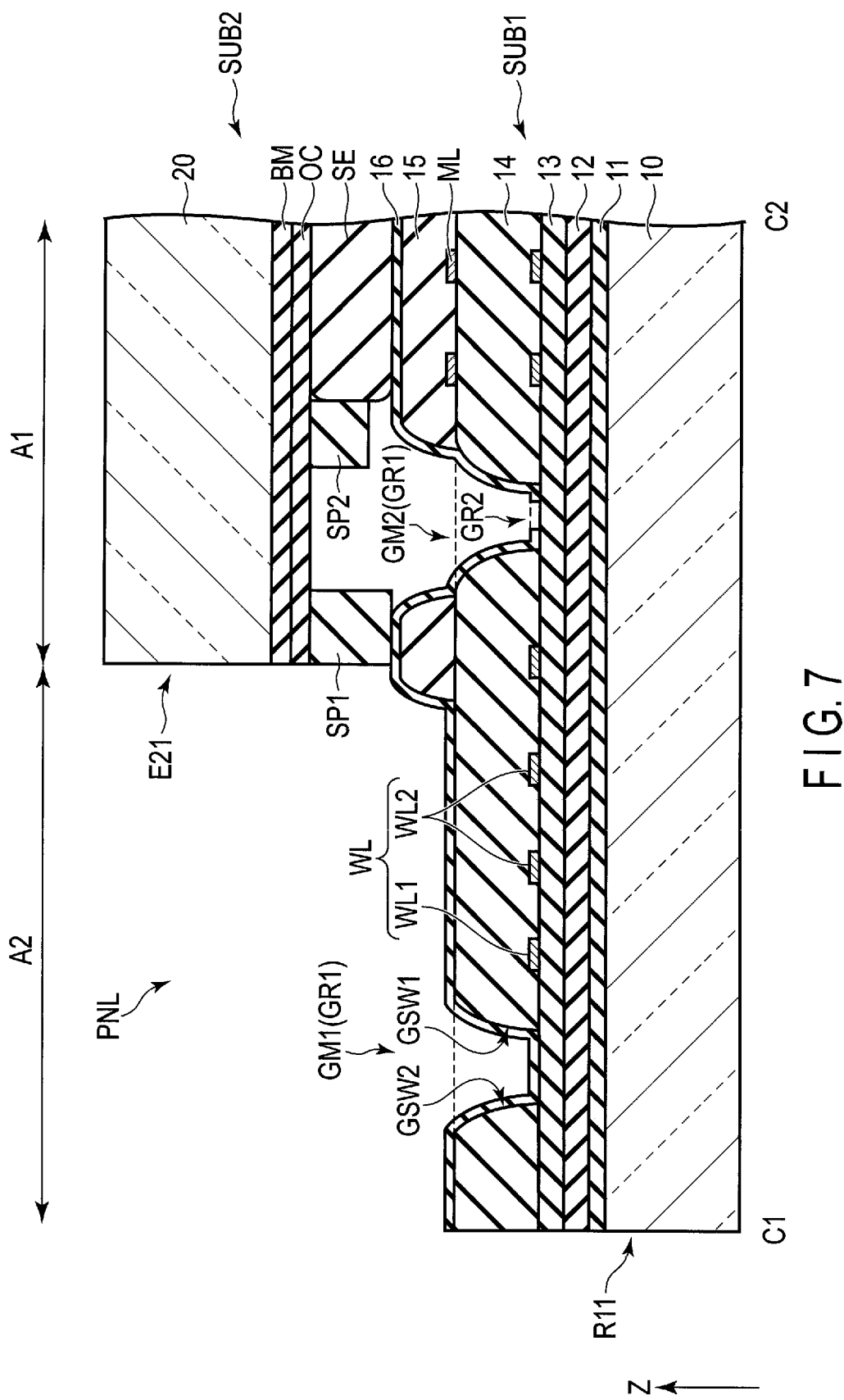
FIG. 7 is a cross-sectional view of the display panel along the C1-C2 line shown in FIG. 6.

FIG. 7 is a cross-sectional view of the display panel along the C1-C2 line shown in FIG. 6. In FIG. 7, the illustration of the alignment films AL1 and AL2 is omitted.

As shown in FIG. 7, the spacers SP1 and SP2 are located under the transparent layer OC, and protrude to the first substrate SUB1. In the example shown in the figure, the spacer SP1 is in contact with the first substrate SUB1. However, the spacer SP1 may not be in contact with the first substrate SUB1. The spacer SP2 is used to prevent the sealant SE from extending to the second area A2 when the first substrate SUB1 is attached to the second substrate SUB2 by the sealant SE.

The conductive lines WL are located on the insulating layer 13, and are covered with the insulating layer 14. The insulating layer 14 exposes the insulating layer 13 in the main portion GM1. The insulating layer 16 covers the insulating layers 13 and 14 in the main portion GM1. In the example shown in the figure, the insulating layer 16 is in contact with the entire area of the insulating layer 13 in the main portion GM1. The insulating layer 14 located on the inner side (in other words, the display area DA side) in comparison with the groove portion GR1 is covered with the insulating layer 16.

The insulating layer 14 exposes the insulating layer 13 in the groove portion GM2. The insulating layer 16 covers the insulating layer 14 and is in contact with the insulating layer 13 in the groove portion GM2. The insulating layer 16 exposes the insulating layer 13 in the groove portion GR2. The insulating layer 13 is exposed to the air in the groove portion GR2.

In the present embodiment, the organic insulating layer 14 comprises the circular groove portion GR1 formed so as to surround the display area DA. More specifically, the circular groove portion GR1 is a groove formed in the organic insulating layer 14, comprises the sidewall GSW1 on the inner side (in other words, the display area DA side) and the sidewall GSW2 on the outer side (in other words, the outline side of the first substrate SUB1). The circular groove portion GR1 linearly surrounds the display area DA, and comprises the terminal portion GT1 in the first end portion E11 of the first substrate. The organic insulating layer 14 is provided from the sidewall GSW2 on the outer side to the end portions (a part of E11, E12, E13 and E14) and the round portions (R11 and R12) of the first substrate SUB1. However, the organic insulating layer 14 is not provided on the end portion E11 side of the first substrate in the terminal portion GT1. The organic insulating layer 14 located on the inner side in comparison with the main portion GM1 of the groove portion GR1 is covered with the inorganic insulating layer 16. The inorganic insulating layer 16 is formed of silicon nitride which hardly allows moisture to pass through. In this structure, even when moisture enters the organic insulating layer 14 located on the outer side (the outline side of the first substrate SUB1) in comparison with the main portion GM1 (the sidewall GSW2), it is possible to prevent the moisture from further moving to the inner side (the display area DA side) in comparison with the main portion GM1 (the sidewall GSW1), thereby preventing, for example, film removal caused by moisture. Further, all the conductive lines WL provided in the first substrate SUB1 are located on the inner side in comparison with the main portion GM1. In the present embodiment, moisture is difficult to enter the inner side in comparison with the main portion GM1. Thus, it is possible to prevent the corrosion of the conductive lines WL by moisture. In this way, the reliability of the display device DSP can be improved.

In the above structural example, the groove portion GR1 corresponds to a first groove portion. The groove portion GR2 corresponds to a second groove portion. The insulating layer 14 corresponds to an organic insulating layer. The insulating layer 13 corresponds to a first inorganic insulating layer. The insulating layer 16 corresponds to a second inorganic insulating layer. The sidewall GSW1 corresponds to a first sidewall. The sidewall GSW2 corresponds to a second sidewall.

Figure 8:
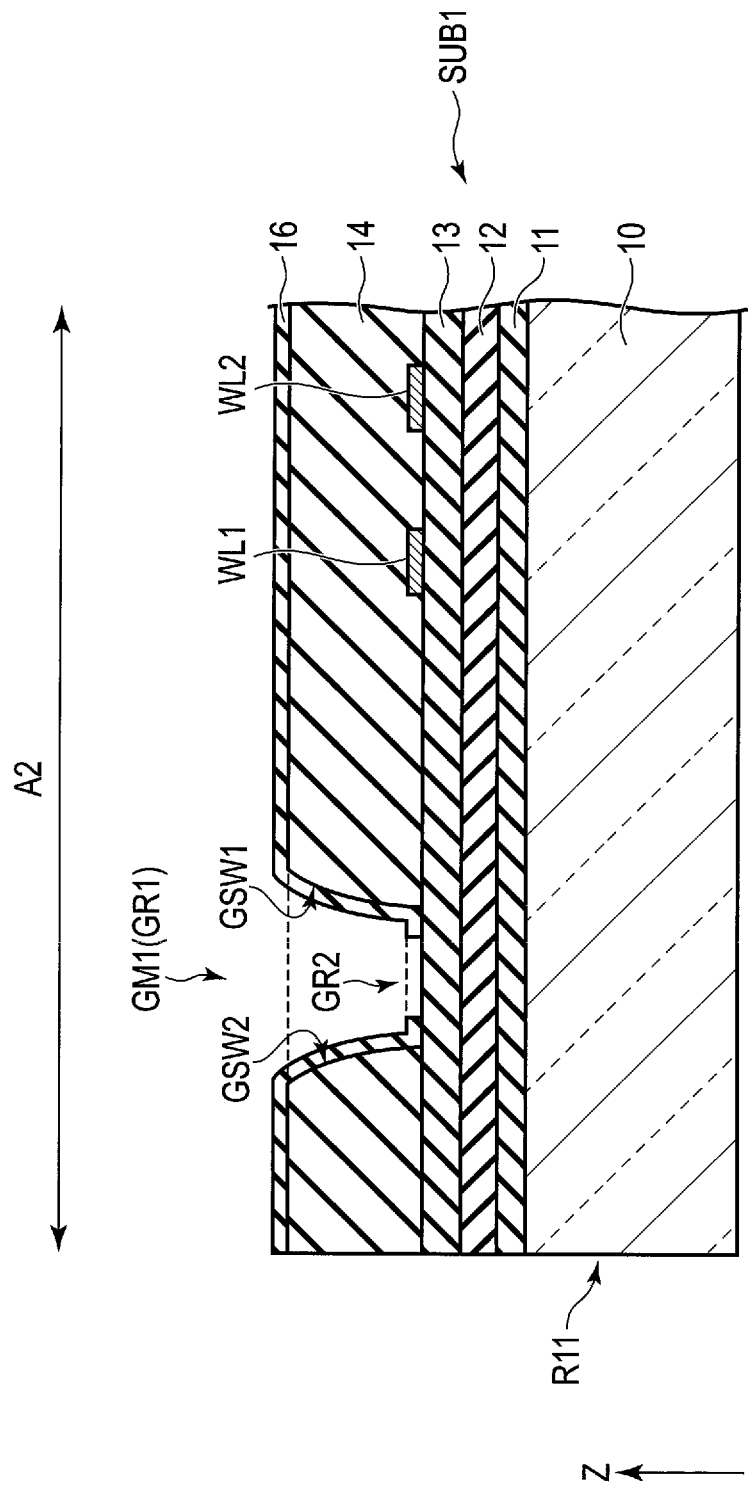
FIG. 8 is a cross-sectional view showing a modified example of the first structural example shown in FIG. 7.

FIG. 8 is a cross-sectional view showing a modified example of the first structural example shown in FIG. 7.

As shown in FIG. 8, the modified example of the first structural example is different from the first structural example in respect that the insulating layer 16 comprises the groove portion GR2 in the main portion GM1. The groove portion GR2 is located between the sidewall GSW1 and the sidewall GSW2. The insulating layer 16 exposes the insulating layer 13 in the groove portion GR2. The insulating layer 16 covers the insulating layer 14 and is in contact with the insulating layer 13 in the main portion GM1. The insulating layer 13 is exposed to the air in the groove portion GR2.

In this modified example, the same effect as the first structural example is obtained. In addition, the insulating layer 13 is exposed to the air in the groove portion GR2. Thus, even when the moisture which entered the organic insulating layer 14 located on the outer side in comparison with the groove portion GR1 moves through the interface between the insulating layer 13 and the insulating layer 16 in the groove portion GR1, the moisture escapes into the air in the groove portion GR2. In this way, it is possible to further prevent the moisture which entered the organic insulating layer 14 located on the outer side in comparison with the groove portion GR1 from moving from the outer side in comparison with the groove portion GR1 to the inner side.

Figure 9:
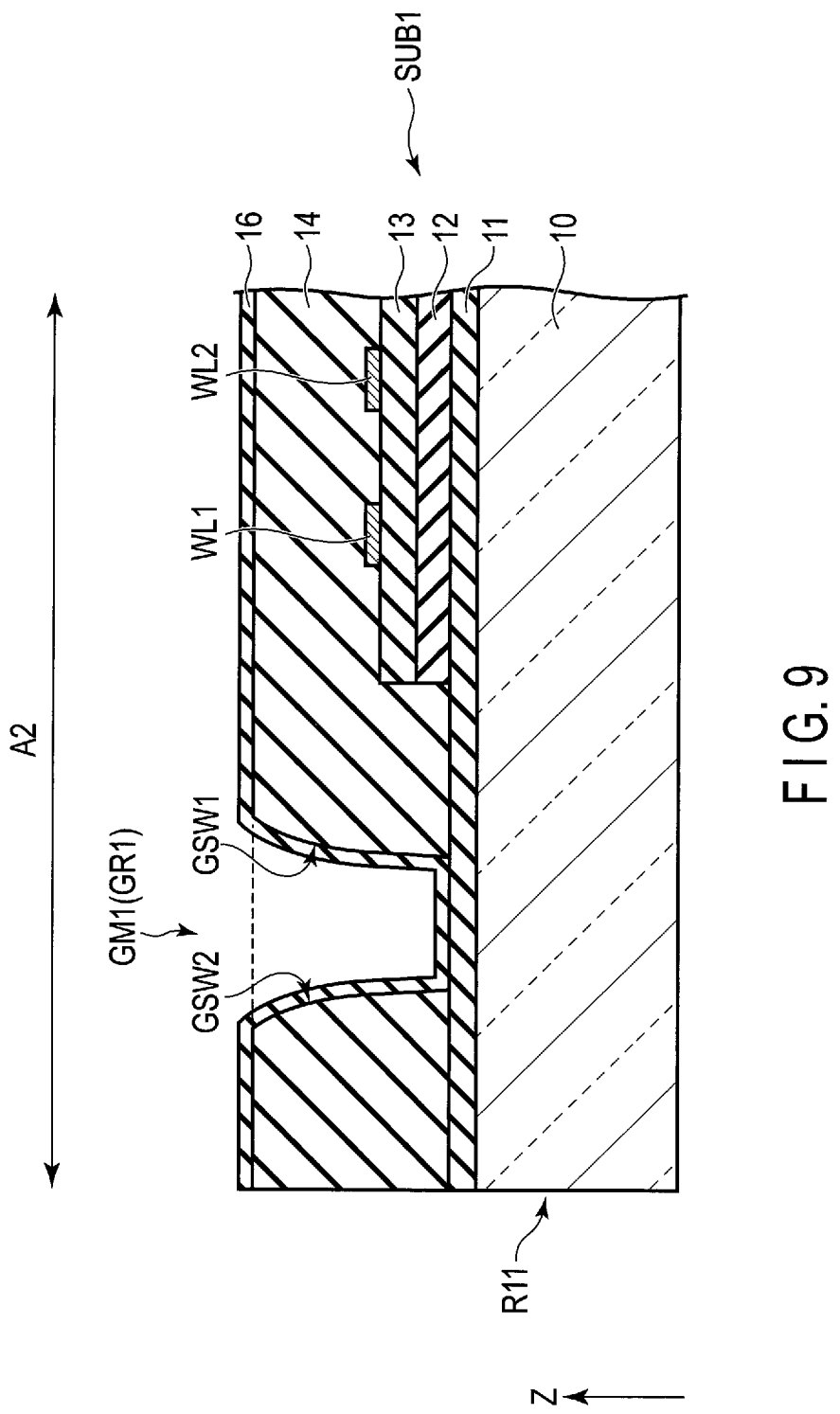
FIG. 9 is a cross-sectional view showing a second structural example of the display panel.

FIG. 9 is a cross-sectional view showing a second structural example of the display panel PNL.

As shown in FIG. 9, the second structural example is different from the first structural example in respect that neither the insulating layer 12 nor the insulating layer 13 extends to the round portion R11. In the example shown in the figure, the main portion GM1 is located between the round portion R11 and the insulating layers 12 and 13. The insulating layer 14 exposes the insulating layer 11 in the main portion GM1. The insulating layer 16 covers the insulating layers 11 and 14 in the main portion GM1. In the example shown in the figure, the insulating layer 16 is in contact with the entire area of the insulating layer 11 in the main portion GM1. The insulating layer 16 covers the insulating layers 12 and 13.

In the second structural example, the same effect as the first structural example is obtained. In addition, neither the insulating layer 12 nor the insulating layer 13 is provided on the outer side in comparison with the groove portion GR1. Thus, the possibility that the insulating layers 12 and 13 are exposed to moisture can be reduced. The film removal between the insulating layer 12 and the insulating layer 13 can be prevented.

In the above structural example, the insulating layer 11 corresponds to the first inorganic insulating layer.

Figure 10:
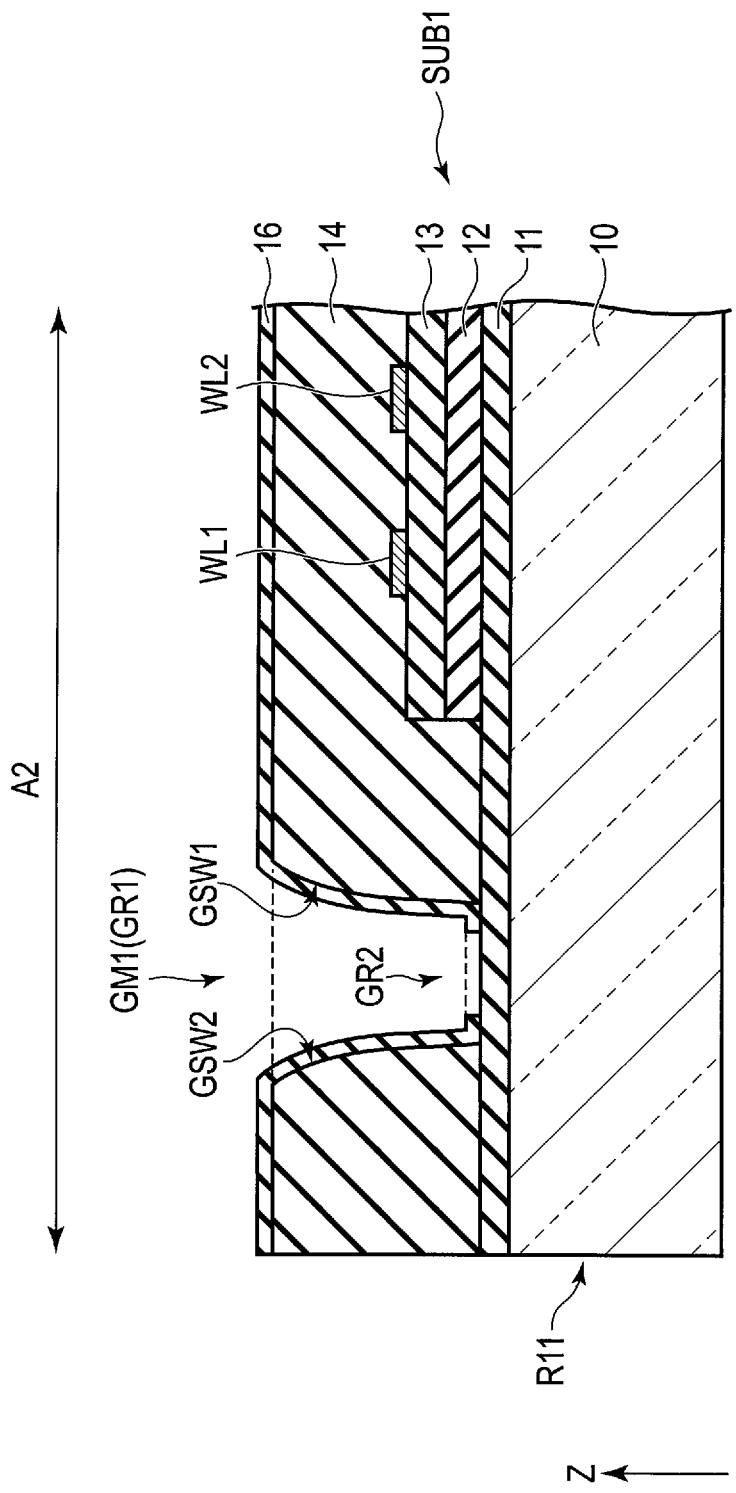
FIG. 10 is a cross-sectional view showing a first modified example of the second structural example shown in FIG. 9.

Now, this specification explains a modified example of the second structural example with reference to FIG. 10 and FIG. 11.

FIG. 10 is a cross-sectional view showing a first modified example of the second structural example shown in FIG. 9.

As shown in FIG. 10, the first modified example of the second structural example is different from the second structural example in respect that the insulating layer 16 comprises the groove portion GR2 in the main portion GM1. The insulating layer 16 exposes the insulating layer 11 in the groove portion GR2. The insulating layer 16 covers the insulating layer 14 and is in contact with the insulating layer 11 in the main portion GM1. The insulating layer 11 is exposed to the air in the groove portion GR2.

In the first modified example, the same effect as the second structural example is obtained. In addition, the insulating layer 11 is exposed to the air in the groove portion GR2. Thus, even when the moisture which entered the organic insulating layer 14 located on the outer side in comparison with the groove portion GR1 moves through the interface between the insulating layer 11 and the insulating layer 16 in the groove portion GR1, the moisture escapes into the air in the groove portion GR2. In this way, it is possible to prevent the moisture which entered the organic insulating layer 14 located on the outer side in comparison with the groove portion GR1 from moving from the outer side in comparison with the groove portion GR1 to the inner side.

FIG. 11 is a cross-sectional view showing a second modified example of the second structural example shown in FIG. 9.

As shown in FIG. 11, the second modified example of the second structural example is different from the second structural example in respect that the insulating layer 14 located on the outer side in comparison with the groove portion GR1 is not provided. In other words, the insulating layer 14 does not extend to the round portion R11. The groove portion GR1 comprises the inner sidewall GSW1 and does not comprise the outer sidewall GSW2. In the example shown in the figure, the insulating layer 16 covers the insulating layers 12 to 14, and is in contact with the insulating layer 11.

In the second modified example, the same effect as the above structural example is obtained.

As explained above, the present embodiment allows the provision of a display device and a substrate comprising an organic insulating layer in which the reliability can be improved.

While certain embodiments have been described, these embodiments have been presented by way of example only, and are not intended to limit the scope of the inventions. The display device explained in the above embodiment is not limited to a liquid crystal display device. The display device may be a self-luminous display device such as a micro-LED display device or an organic EL display device, or an electrophoretic display device. The present embodiment is not limited to a display device, and may be a substrate comprising an organic insulating layer in which a circular groove portion is formed, and may be a sensor substrate. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first substrate comprising a first area including a display area, a second area adjacent to the first area, and an organic insulating layer formed over the first area and the second area; and
    a second substrate comprising a substrate end located in a border between the first area and the second area, the second substrate overlapping the first area, wherein
    the first area is an area in which the first substrate overlaps the second substrate,
    the second area is an area in which the first substrate is exposed from the second substrate,
    the organic insulating layer comprising a first groove portion surrounding the display area, the first groove portion formed along an outline of the first substrate,
    the first groove portion comprises a main portion and a terminal portion,
    the main portion comprises a first sidewall formed by the organic insulating layer and located on a display area side and a second sidewall formed by the organic insulating layer, located on a side opposite to the first sidewall and located on the outline side of the first substrate,
    the first and second sidewalls forming the main portion intersect the substrate end in a plan view,
    the first substrate further comprises a plurality of terminals located in the second area and connected to a signal source,
    the terminal portion overlaps the terminals,
    the terminals are exposed from the organic insulating layer in the terminal portion,
    the main portion is integrally formed with the terminal portion, and
    the main portion is continuous with the terminal portion.

2. The display device of claim 1, wherein
    the first substrate further comprises a plurality of conductive lines connected to the terminals, and
    the conductive lines comprise an outermost conductive line closest to the outline of the first substrate, and the outermost conductive line is located on an inner side in comparison with the first sidewall of the main portion in a plan view.

3. The display device of claim 2, wherein
    the first substrate further comprises a first inorganic insulating layer, the conductive line located above the first inorganic insulating layer, and a second inorganic insulating layer covering the organic insulating layer,
    the organic insulating layer covers the conductive lines, and exposes the first inorganic insulating layer in the first groove portion, and
    the second inorganic insulating layer is in contact with the first inorganic insulating layer in the first groove portion.

4. The display device of claim 3, wherein
    the second inorganic insulating layer is in contact with an entire area of the first inorganic insulating layer in the first groove portion.

5. The display device of claim 4, wherein
    the second inorganic insulating layer is formed over the first area and the second area, and comprises a second groove portion overlapping the first groove portion in the first area.

6. The display device of claim 3, wherein
    the second inorganic insulating layer is formed over the first area and the second area, and comprises a second groove portion overlapping the first groove portion in the first area.

7. The display device of claim 1, further comprising a sealant for attaching the first substrate to the second substrate in the first area, and
    the first groove portion overlaps the sealant in a plan view.

8. The display device of claim 1, wherein
    the second substrate further comprises a spacer located in the substrate end, and
    the spacer intersects the first groove portion in a plan view.

9. The display device of claim 1, wherein
    the first groove portion is formed in a curved shape along an outline of the first substrate.

10. A substrate comprising:
    an insulating substrate comprising a first area, and a second area adjacent to the first area;
    a plurality of terminals located in the second area and connected to a signal source;
    a plurality of conductive lines connected to the terminals and extending in the first area; and
    an organic insulating layer formed over the first area and the second area, wherein
    the organic insulating layer comprises a groove portion formed along an outline of the insulating substrate,
    the groove portion comprises a main portion and a terminal portion,
    the main portion comprises a first sidewall formed by the organic insulating layer on a display area side, and a second sidewall formed by the organic insulating layer, located on a side opposite to the first sidewall and located on the outline side, the conductive lines comprise an outermost conductive line closest to the outline,
the outermost conductive line is located on an inner side in comparison with the first sidewall in a plan view,
the terminal portion overlaps the terminals,
the terminals are exposed from the organic insulating layer in the terminal portion,
the main portion is integrally formed with the terminal portion, and
the main portion is continuous with the terminal portion.

* * * * *